United States Patent
Thompson

(10) Patent No.: US 8,814,660 B2
(45) Date of Patent: Aug. 26, 2014

(54) FANTASY BETTING APPLICATION AND ASSOCIATED METHODS

(76) Inventor: Christopher Cody Thompson, Orlando, FL (US)

(*) Notice: Subject to any disclaimer, the term of this patent is extended or adjusted under 35 U.S.C. 154(b) by 81 days.

(21) Appl. No.: 13/313,777

(22) Filed: Dec. 7, 2011

(65) Prior Publication Data

US 2012/0142411 A1    Jun. 7, 2012

Related U.S. Application Data

(60) Provisional application No. 61/420,519, filed on Dec. 7, 2010.

(51) Int. Cl.
| | | |
|---|---|---|
| A63F 9/24 | (2006.01) | |
| A63F 13/00 | (2014.01) | |
| G06F 17/00 | (2006.01) | |
| G06F 19/00 | (2011.01) | |

(52) U.S. Cl.
USPC .............................................. 463/25; 463/29

(58) Field of Classification Search
USPC ................................... 466/25, 29; 463/25, 29
See application file for complete search history.

(56) References Cited

U.S. PATENT DOCUMENTS

| | | | |
|---|---|---|---|
| 5,842,921 A | 12/1998 | Mindes et al. | |
| 6,712,701 B1 | 3/2004 | Boylan, III et al. | |
| 7,206,762 B2 | 4/2007 | Sireau | |
| 7,387,571 B2 | 6/2008 | Walker et al. | |
| 7,690,991 B2 | 4/2010 | Black | |
| 7,716,113 B2 | 5/2010 | Crosthwaite et al. | |
| 7,774,259 B1 | 8/2010 | Satterfield et al. | |
| 7,788,158 B2 | 8/2010 | Pennock | |
| 7,912,766 B2 | 3/2011 | Kadikar | |
| 7,996,297 B2 | 8/2011 | Crosthwaite et al. | |
| 2001/0056412 A1 | 12/2001 | Kutsuzawa et al. | |
| 2002/0037767 A1 | 3/2002 | Ebin | |
| 2002/0111213 A1 | 8/2002 | McEntee et al. | |
| 2002/0155885 A1 | 10/2002 | Shvili | |
| 2003/0018564 A1 | 1/2003 | Bonnier et al. | |
| 2003/0097326 A1 | 5/2003 | Kivimaki | |
| 2003/0212623 A1 | 11/2003 | Aylmer et al. | |
| 2004/0015429 A1 | 1/2004 | Tighe et al. | |
| 2004/0193531 A1 | 9/2004 | Amaitis et al. | |
| 2004/0210507 A1 | 10/2004 | Asher et al. | |
| 2004/0215542 A1 | 10/2004 | Rossides | |
| 2005/0003878 A1 | 1/2005 | Updike | |
| 2005/0027643 A1 | 2/2005 | Amaitis et al. | |
| 2005/0154617 A1 | 7/2005 | Ruggieri et al. | |
| 2007/0060380 A1 | 3/2007 | McMonigle et al. | |
| 2007/0073609 A1 | 3/2007 | Odom et al. | |
| 2007/0106553 A1 | 5/2007 | Jordan et al. | |
| 2007/0129123 A1 | 6/2007 | Eryou et al. | |

(Continued)

Primary Examiner — William M. Brewster
(74) Attorney, Agent, or Firm — Mark R. Malek; William A. Harding; Zies Widerman & Malek

(57) ABSTRACT

A fantasy betting application operated on a computerized device for managing a bet relating to statistics of a sporting event. The statistics may relate to a team, position, play, or player. The terms of the bet may be defined relating to a bet amount, bet type, scoring procedure, and duration. The bet may be created by a creator using an interface. A user may view and accept the bet. The user may also make a counteroffer to negotiate the terms of the bet. Users may create and join leagues and private groups. The bet may be confirmed when the creator and the user agree on terms. Funds relating to the bet may be collected and dispersed.

30 Claims, 8 Drawing Sheets

(56) References Cited

U.S. PATENT DOCUMENTS

| | | |
|---|---|---|
| 2007/0129141 A1 | 6/2007 | Walker et al. |
| 2008/0015969 A1 | 1/2008 | Mowshowitz |
| 2008/0039192 A1* | 2/2008 | Laut ............................... 463/25 |
| 2008/0064488 A1 | 3/2008 | Oh |
| 2008/0113769 A1 | 5/2008 | Montero et al. |
| 2008/0195459 A1 | 8/2008 | Stinski |
| 2008/0268931 A1 | 10/2008 | Alderucci et al. |
| 2008/0318655 A1 | 12/2008 | Davies |
| 2009/0076939 A1 | 3/2009 | Berg et al. |
| 2009/0149233 A1 | 6/2009 | Strause et al. |
| 2010/0035677 A1* | 2/2010 | Kido et al. .......................... 463/16 |
| 2010/0062840 A1 | 3/2010 | Herrmann |
| 2010/0087247 A1 | 4/2010 | Joshi et al. |
| 2010/0144426 A1 | 6/2010 | Winner et al. |
| 2010/0151930 A1 | 6/2010 | Oram |
| 2010/0203935 A1 | 8/2010 | Levy et al. |
| 2010/0203963 A1 | 8/2010 | Allen et al. |
| 2010/0298045 A1 | 11/2010 | Patel |
| 2010/0311484 A1 | 12/2010 | Suh et al. |
| 2010/0317442 A1 | 12/2010 | Thomas et al. |
| 2011/0053681 A1 | 3/2011 | Goldman et al. |
| 2011/0066542 A1 | 3/2011 | Burgis et al. |
| 2011/0086699 A1 | 4/2011 | Allen et al. |

* cited by examiner

FANTASY BETTING APPLICATION AND ASSOCIATED METHODS

RELATED APPLICATIONS

This application claims the benefit of an earlier filed provisional patent application—U.S. Patent Application Ser. No. 61/420,519, filed by the inventor of the present invention on Dec. 7, 2010, the contents of which are incorporated herein by reference in its entirety.

FIELD OF THE INVENTION

The present invention relates generally to a online betting and wagering system and associated computer implemented methods relating to the same.

BACKGROUND OF THE INVENTION

In 2006 the Unlawful Internet Gambling Enforcement Act (UIGEA) was enacted, which attempted to dose the US market, making it illegal to transfer funds relative to online gambling. The legislation, however, limited the definition of the term "bet or wager" to exclude fantasy or simulation sports games provided: (1) all prizes and awards are established and made known to participants in advance of the game or contest; (2) value of the prizes or awards are not determined by the number of participants or amount of fees paid by participants; (3) winning outcomes reflect the relative knowledge and skill of the participants and is determined predominately by accumulated statistical results of the performance of individuals in multiple real world sporting or other events; and (4) no winning outcome is based on score, point-spread or performance of any single real-world team or any combination of such teams, or solely on any single performance of an individual athlete in any single real-world sporting or other event.

After an initial hit in revenues the industry turned around and has exhibited steady growth. In fact, in 2009 the online gaming industry in the United States alone was estimated at over $5 billion annually and over $20 billion annually worldwide. Current estimates suggest that the U.S. share of online gambling has more than tripled, with worldwide online gambling approaching $50 billion annually. It is estimated that the U.S. sports betting market is approximately $7 to $11 billion annually.

Currently there are a number of online platforms that enable gambling and wagering activities. To date this online gambling industry generally consists of online poker rooms and tournaments, online sports betting and online casinos.

Recently there have been reports of preliminary talks politically about taxing the online gambling industry instead of banning it, perhaps spurred forward by record budget deficits in many countries across the globe. Therefore, it would be desirable to have an online gambling and wagering system that enables fantasy sports gambling/wagering while still complying with the UIGEA. Furthermore, it would also be desirable to have an online gambling and wagering system configurable to expand beyond the scope of the UIGEA should legislation be enacted in the United States that enlarges the scope of legal activities. Therefore, there currently exists a need in the industry for an online gambling and wagering system that allows interested individuals to place bets on a variety of fantasy sports related outcomes.

SUMMARY OF THE INVENTION

The present system and associated computer implemented methods advantageously fulfill the aforementioned deficiencies by providing a fantasy betting application and associated computer implemented methods to provide participants a safe, business friendly and controlled online environment for betting on a variety statistics relating to fantasy sports outcomes.

According to an embodiment, the invention is an online betting system that utilizes a website available on either an open platform (i.e., World Wide Web; Internet) or a closed platform (i.e., Intranet) that allows users to connect directly to facilitate betting on a variety of fantasy sports outcomes. In essence the invention connects motivated, willing and able individuals for the purpose of allowing those individuals to find betting partners with primary emphasis on fantasy sports betting. In some embodiments, however, it is possible to use the system and associated methods to facilitate betting more generally.

The system is designed and engineered to give users the ability to create, accept, view, negotiate, and manage bets against other users thus eliminating the middle man and giving individuals the ability to set all their own settings, terms, and conditions. When viewing a bet the user may either accept or propose a counteroffer. A counteroffer may mean any number of things, for example it could be a conditional acceptance, conditionally taking a bet someone else created, but subject to clarification. A counteroffer may also include the modification of one or more parameters of the bet, including one or more material terms, potentially modifying or editing the bet in even a substantial way. The conditional, modified or edited bet may then be sent back the originating user who can either accept it or counteroffer again. In the scenario where there is an acceptance the bet may be finalized into a confirmed bet. If a counteroffer or one or another kind is made it is routed back to the original counterofferor. The system enables this back and forth until either a bet is finalized, a bet is rejected or time expires before the start of one or more events that are the subject of the underlying bet.

The system also includes the ability to create a bet. Additionally, the system can also incorporate community features including leagues, friends lists, private and public customization, a bettor ranking system, frequent player point program, chat channels, mini-leagues and a real-time bettor program.

Among other things, it is an object of the present invention to provide a fantasy sports online betting and wagering system and associated computer implemented methods that does not suffer from any of the problems or deficiencies associated with prior solutions.

According to an embodiment of the present invention, a method provides for managing a bet relating to statistics of a sporting event using a fantasy betting application, the bet generally including a created bet and a confirmed bet. The method includes creating the bet by a creator by defining rules relating to availability of the bet and controlling terms of the bet. Creating the bet further includes defining at least one of a team, a position, a play, and a player relating to the sporting event to be a subject of the bet, and defining the rules to selectively allow a counteroffer to be makeable.

Allowing the counteroffer to be makeable includes defining a range of allowable terms for the counteroffer. Additionally, at least one of a bet amount, bet type, and scoring procedure are definable by the rules. The bet amount may define a value of the bet. Also, the bet type may define criteria for determining a winner. The scoring procedure may define an objective measurement of the statistic relating to the bet using the criteria for determining the winner. A duration of the bet may be definable. Odds relating to the bet may also be definable.

The bet may be posted as the created bet to be receivable and viewable by a user using an interface. The user may be enabled to selectively confirm the created bet as the confirmed bet. The user may also be enabled to transmit at least one of a question and the counteroffer relating to the created bet to the creator using the interface. The question may be communicated to the creator to be selectively responded to. Additionally, the counteroffer initiates a negotiation of the terms of the created bet within the range of allowable terms with the creator for selective acceptance by the creator and the user.

The negotiation initiated by the counteroffer may include intercommunication between the creator and the user to modify the terms of the created bet. The created bet is confirmable as the confirmed bet upon mutual agreement of the terms by the creator and the user. An alert may be generated to indicate confirmation of the created bet as the confirmed bet. The rules may be managed by a rules engine. Additionally, the rules may be stored in a database included in a computerized device with a processor and memory.

According to an embodiment of the present invention, the user may be associated with user data to indentify information relating to the user. A league is definable to include members selected from a group of users. The league may be configured to include membership restrictions relating to the user data of each user in the group of users. The user data may be compared with the membership restrictions to determine eligibility of the user for admission into the league and wherein the alert is generated to indicate the eligibility. Also, the league may include a moderator to selectively analyze the bet with the rules in the database for compliance with the rules to determine whether the bet is approvable. The moderator may be associated with the league.

According to an embodiment of the present invention, the user may be included in a group of users. A community interface may be included to selectively share user data with additional users in the group of users. The community interface may also provide intercommunication among each user in the group of users. At least part of the user data may selectable between being privately held and publicly shared. User data that is publicly shared may be comparable by each user with at least one other user in the group of users. The intercommunication provided by the communication interface may include one or more of electronic mail, text chat, voice communication, bulletin boards, forums, the alerts, and video chat.

According to an embodiment of the present invention, a performance based ranking system may be included to provide a ranking of each user against the group of users. Operation of the performance based ranking system may include defining the rules to assign weighted points to the bet relating to the terms of the bet and an outcome of the bet. The ranking may be defined by an accumulation of the weighted points. Additionally, the ranking may be associated with the user. The bet made by the user may be compared to the rules to determine a number of weighted points to be added to the accumulation of weighted points of the user. The accumulation of weighted points of the user may be compared to the accumulation of weighted points of additional users within the group of users to determine the ranking of the user among the users in the group.

According to an embodiment of the present invention, the creator may selectively allow the bet to be split. The user selectively may also request the bet to be split. Splitting the bet may include allowing parts of the bet to be independently confirmable. Conversely, not splitting the bet may include requiring the entirety of the bet to be confirmable.

According to an embodiment of the present invention, statistics relating to the bet may be included on a network connected device to be accessed by the fantasy betting application. Also, the expiration of the bet may be selectively definable.

According to an embodiment of the present invention, the bet may require approval from a moderator prior to the bet being confirmable. For approval, the moderator may analyze the bet with the rules in the database for compliance with the rules to determine whether the bet is approvable. The alert may be generated to indicate whether the bet is approvable.

According to an embodiment of the present invention, funds for the bet may be accepted. The funds may be collected are defined by the terms of the bet. The funds may be held until the winner of the bet is determined. Additionally, a part of the funds may be dispersed to the winner of the bet after the winner is determined. Dispersing of the funds to the winner may be selectively moderated. Also, a fee may be selectively collectible from the funds prior to dispersing remaining funds to the winner.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and may fully convey the full scope of the invention to those skilled in the art.

DETAILED DESCRIPTION OF THE INVENTION

Figure 1:
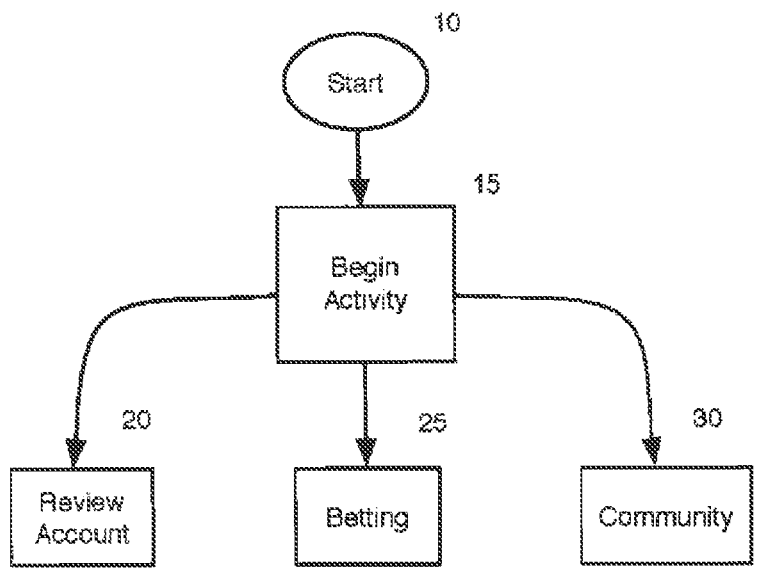
FIG. 1 shows a basic overview of the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

The present invention is directed to a fantasy betting application and associated computer implemented methods for online sports betting and wagering. More information regarding legal issues that may relate to fantasy sports are discussed in Edelman, M., (2011 seminar at Barry Law School, Orlando, Fla.), *A Short Treatise on Fantasy Sports and the Law: How America Regulates its New National Pastime* (a working draft); the final version to be published in the January 2012 edition of the *Harvard Journal of Sports and Entertainment Law.*, the entirety of which is hereby incorporated by reference.

In the preferred embodiment, the present invention will be used for betting and wagering on sporting events to be determined by a skill of a user. In this preferred embodiment, the user will use analytical skills to evaluate statistical data relating to a player, team, or sporting event to predict an outcome of at least a part of that event. The user may also use analytical skills to comprise a collection of players, which may be included in a roster of players. After analyzing which players, or other aspects of the sporting event, may be best adapted to the betting strategy of a user, the player may elect add that player to his or her roster. This strategic analysis may be analogous to, without being limited to, the analysis of intrinsic and extrinsic values of a company by a stock trader.

However, in additional embodiments of the present invention, the fantasy betting application may be used to place additional bets or wagers relating to various aspects of the sporting event. These additional bets or wagers may be based on skill, knowledge, or even chance. A person of skill in the art will appreciate that although the present invention is contemplated include creating and confirming bets based on chance, that feature may be selectively enabled or disabled to comply with the regulations, policies, and/or laws of an environment where the present invention may be operated.

In the following disclosure, a creator and a user will be discussed. A creator may be a type of user that may initially define and originate a bet. The user may, more generally, interface with the system to view, accept, negotiate, and otherwise manage a bet. The bet originated by the creator may be referred to as a created bet. Once the terms of the bet have been mutually agreed upon by the creator and the user that accepts the bet, the created bet may become the confirmed bet.

The user may interact with the fantasy betting application through an interface. The interface may include a plurality of additional interfaces which may be associated with tasks relative to that interface. Examples of the additional interfaces will be discussed below. Alerts and messages may be communicated to a user through the interface, which are also discussed below. A message may be included within an alert, and may be provided to a user as an alert. Additionally, an alert may be generated, for example, upon the occurrence of an event, to convey a message. Examples of alerts may include pop-ups, emails, text messages, audible sounds, and numerous other indications that may elicit the attention of a user.

Additionally, the following disclosure includes a plurality of operations that involve comparing data or information with rules. The data or information may be generated, for example, by a user, which may result from a skill based analysis. The rules may define a range of acceptable information, actions to be performed in relation to certain information, and other processes that may be performed by the fantasy betting application of the present invention. A plurality of rules may be included in a rules engine to define, compare, and analyze plurality of operations to be performed by the fantasy betting application. A person of skill in the art will appreciate that analyzing information, data, for compliance with the rules may include comparing the information or data to the rules. Moreover, a comparison may be viewed as a type of analysis performed on data or information, including, but not limited to, user data or statistics, without limitation.

The rules engine, and the rules that may comprise the rules engine, may be stored in a database on a computerized device. Statistics relating to a sporting event subject to the bet may also be included in the database. The database may be comprised of a plurality of subset databases, such as a rules database, account database, sports statistics database, and numerous additional databases that would be apparent after having the benefit of this disclosure. The subset databases may be physically included in one device or across multiple connected devices, such as, for example, over a network. An illustrative embodiment of a computerized device will be discussed in greater detail below with reference to FIG. 9.

Referring to the figures, FIG. 1 shows a basic overview of the system according to an embodiment of the present invention. From the start 10, users may begin their activity 15 for any session or visit. Users can, among other things review account settings 20, engage in a variety of bet related activities 25 or engage in a variety of community activities 30, such as, but not limited to, chatting with other users currently online in real time (i.e., instant message), video chat (i.e., Skype, iChat, etc.), sending electronic messages (i.e., e-mail, SMS text, comment on a post, bulletin board, etc.) or other means of communication enabled by the computer implemented system according to an embodiment of the present invention. The community activities may be accessed through a community interface.

The account review section, which may be labeled, for example, "My Account," indicated by Block 20 may provide information pertaining to a user and/or a creator. User data relating to personal statistics, customizable settings, a profile page, betting history, and access to a friend list and/or funds management interface, or Cashier, are all among things available in the account review section. User data, which may relate to personal statistics, may refer to statistics relative to betting history, for instance and without limitation, win rate, number of bets created, accepted, overall, and/or average bet size. Also, monetary statistics may be provided such as, for example, return on investment and profit margin.

Editing or customization may also be performable using the account review section. Any and all other modifiable setting may be located in this section. You may also access your complete and comprehensive betting history through here. This may allow a user to view any bet you have ever made here and the result. Also, the visibility of user data between being privately held and publically disclosed may be controlled. The visibility of the user data may be selectively configured respective to another user, group, and/or league. This selective configuration allows controlling access to certain user data with regard to, for example, specific users or users on your friends list and league. Skilled artisans will appreciate that the friends list, funds management interface, and other interfaces may be accessed through the account review section or additional locations and interfaces included in the fantasy betting application.

Figure 2:
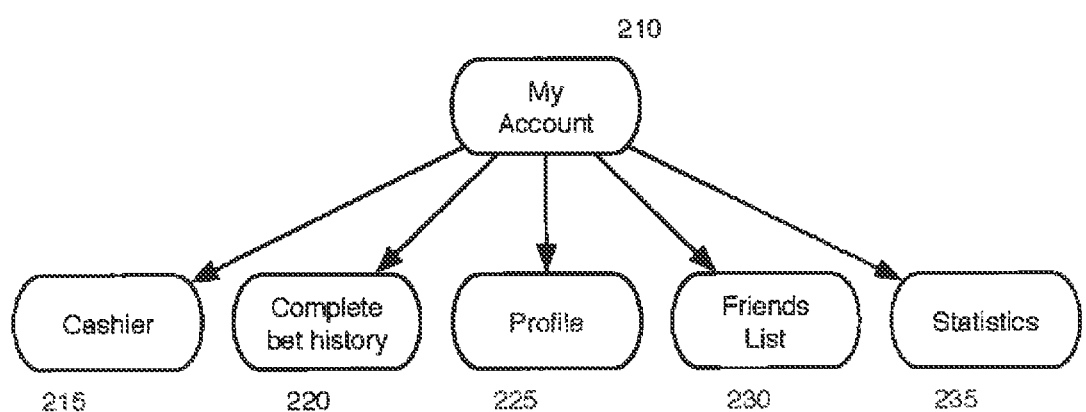
FIG. 2 shows an illustrated schematic of a player's account according to an embodiment of the present invention.

FIG. 2 shows an illustrative schematic depicting some of the functionality of the user's account 210 (also referred to in this specification as "My Account"), according to an embodiment of the present invention. From a user's account 210, the Cashier functionality 215 may allow funds to be credited to the player, as well as allowing for funds to be transferred, paid or otherwise accessed or moved. Also available may be a complete betting history 220, profile information for the user 225, such as but not limited to a single profile page containing information provided by the user. The profile 225 can also include a complete or selective betting history, complete or selective statistics, user tendencies and/or bettor ranking, among other things. Also available through the account 210 is a list of Friends 230, which can be customizable and categorized, enabling quick messaging or chatting. Additionally, the account 210 provides access to a variety of statistics, which can relate to both user statistics as well as statistics for any leagues, public or private, of which the user is a member.

Figure 3:
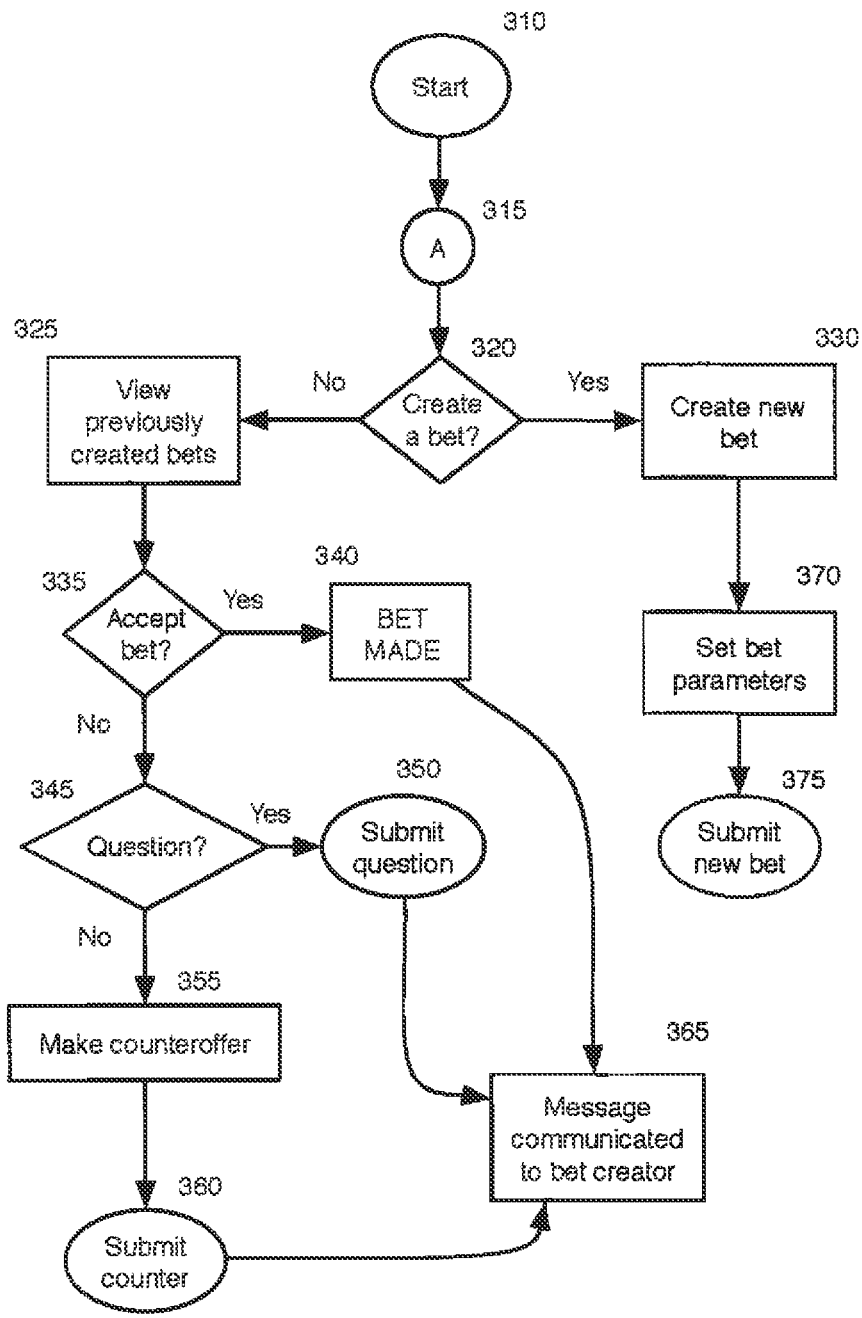
FIG. 3 a basic overview of the method for creating or accepting a bet according to an embodiment of the present invention.
Figure 5:
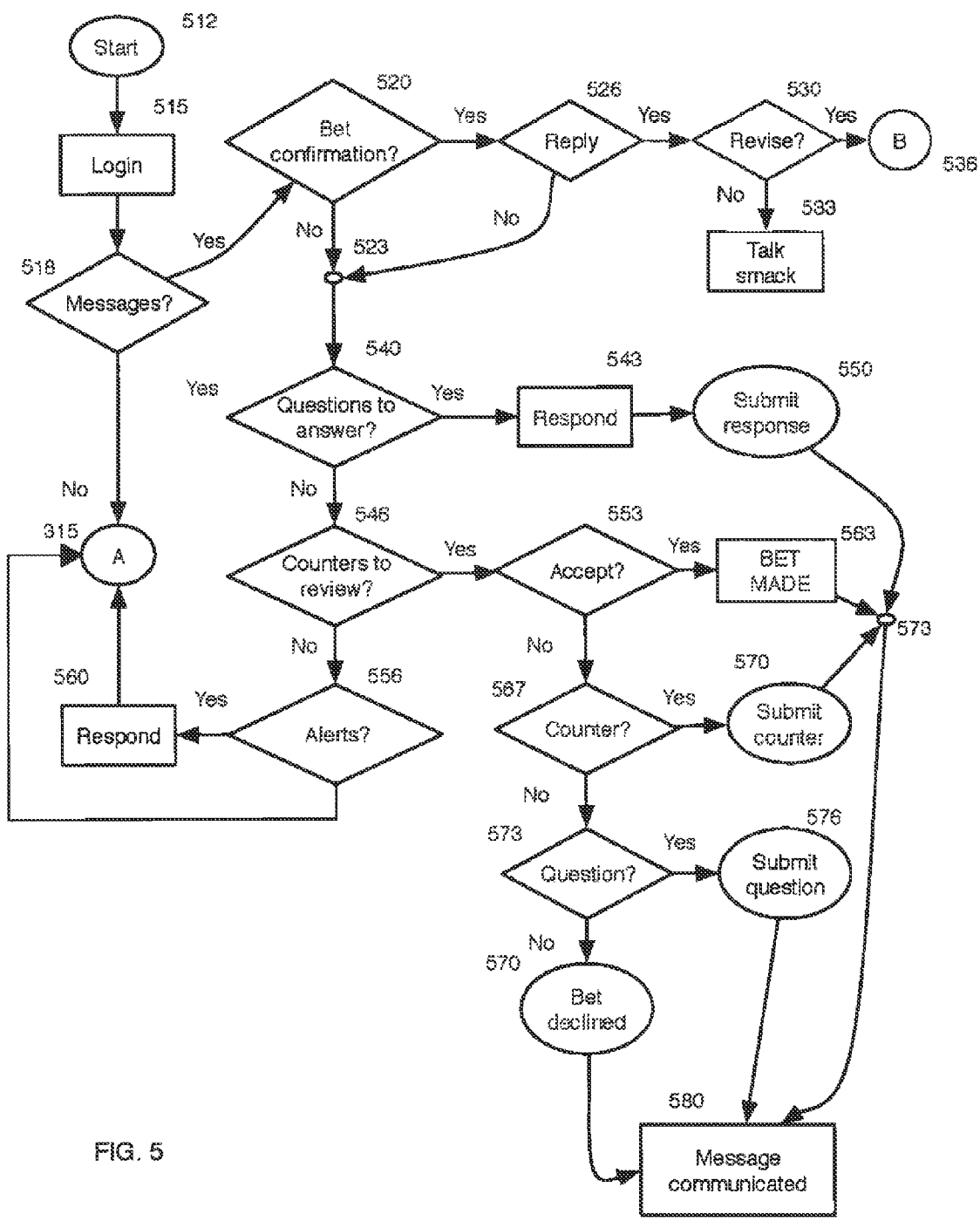
FIG. 5 shows a detailed view of options for responding to messages according to an embodiment of the present invention.

FIG. 3 provides a basic overview of a method according to an embodiment of the present invention directed to creating or accepting a bet. From the start 310 the user may be prompted asking whether they wish to create a bet 320. Before proceeding it should be noted that node 315 is a pass through insofar as this flowchart is concerned. FIG. 5 references this node 315, which will be further discussed infra.

If the user elects to view previously created bets 325, such bets can be accessed in a variety of ways. The user can enter search terms using, for example, a user interface in communication with the system, or keywords to locate available bets, search based on sport, team, player, type of bet or amount wagered, to name but a few. Regardless of how the user finds, navigates or browses through bets the user may select one or more bets and review the terms. The user may then be presented an option of whether to accept the created bet 335. If the created bet is accepted and confirmed without modification or negotiation, then a confirmed bet is made 340 and a message 365 communicating the finalized and confirmed bet is sent to the creator of the bet.

It is, however, possible that the user may not wish to accept the created bet with the initial terms. The user may wish to ask one or more questions 345 of the bet creator, such as, but not limited to, clarifying questions. Questions can be entered in free-form, selected from a drop down menu, for example, checking the box, dragging and dropping a question into a message, or a variety of other techniques for selecting a question. If a question is asked, the user may submit the question 350, or a message including the question may otherwise be communicated to the bet creator 365.

In the event the bet has not been accepted and no question is desired to be sent to the bet creator, the user may, of course, leave the bet (which can be done at any time) or the user may wish to either slightly or materially alter, modify or edit one or more of the bet parameters, which is referred to as making a counteroffer 355. Upon being finalized the counteroffer may be submitted 360 and the counteroffer, or a message including the counteroffer, may be communicated to the bet creator 365. The bet creator may selectively require that a user be locked into a bet upon acceptance of the counteroffer by the creator. Alternatively, the bet creator may allow counteroffer made by a user to be revocable prior to its acceptance by the creator.

Figure 4:
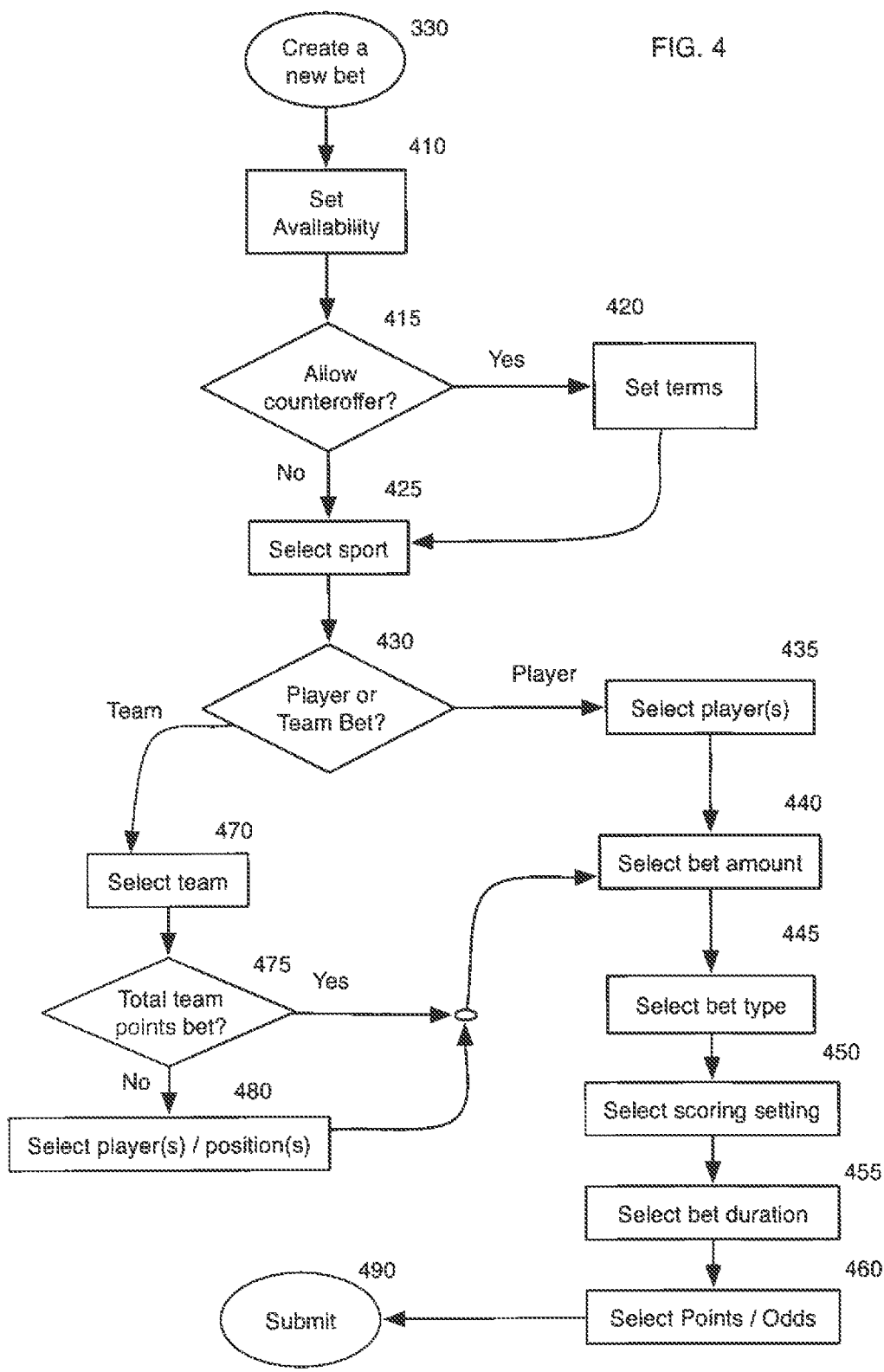
FIG. 4 shows a detailed view of one particular method of creating a bet according to an embodiment of the present invention.

Moving next to FIG. 4, shown is a detailed explanation of the computer implemented method of creating a new bet 330. The start of this flowchart, number 330, refers back to FIG. 3—create new bet 330. Thus, FIG. 4 illustrates the processes initially disclosed in FIG. 3, i.e., creating a new bet 330.

Upon deciding to create a new bet 330, the user may make a number of determinations that will define the bet parameters. One such determination is relative to setting the availability of the bet 410. In this sense the availability of the bet can be considered a condition of the bet (i.e., only if the user meets the defined criteria set by the bet creator can the user accept a bet or enter into negotiations through the counteroffer functionality). In an embodiment of the present invention, and without limitation, there may be four separate settings that can be selected: (1) Public; (2) League; (3) Friends; or (4) Private.

Selecting "public" is defined as the bet being created and being publicly displayed so that anyone in communication with the system may view the created bet, e.g., both registered and unregistered users. A subset of the public setting may also allow for only registered users to be capable of accepting and/or viewing the created bet. Selecting "friends" means that the created bet may only be available to those who are on a Friend List of the bet creator. Selecting "private" means that the created bet is reserved for only those individuals that are specifically invited to review the bet by the bet creator, whether by selecting one or more individuals from the Friends List, looking up a player name or browsing to find one or more particular players that the bet creator may specifically want to challenge to accept the created bet.

Selecting "league" may be accomplished if the bet creator is a member of one or more leagues. Leagues allow users to form or enter a group (i.e., a subset of the universe of users). Leagues can be created by individual users or by administrators. League set bets are exclusively available to those who are members of the league(s) selected. The eligibility of a user to become a member of the league may be controlled by one or more membership restrictions. Examples of membership restrictions may include, but should not be limited to, betting limits, experience, a required number of connections to other league members, favorite sports team, geographic location, shoe size, time zone, telephone area code, favorite color, or virtually any other definable restriction. The membership restrictions may be defined in the rules.

In one embodiment of the invention more than one league may be selected for any particular bet created. For example, a user may be a member of multiple leagues, with one league comprising members interested in betting on fantasy sports associated with, for example, the National Football League (NFL). A user may create a team within the league comprised players selected from a plurality of teams with the subject league, such as the NFL.

The same user may also be a fan of, as an additional example, the Dallas Cowboys and be a member of a league having members is interested in betting on fantasy sports associated with the Dallas Cowboys. This may include a league restriction requiring each member in the league to have at least one player from the Dallas Cowboys on his or her team. A user that is a member of the NFL league and the Dallas Cowboys league, for example, may choose to make a particular bet available to both leagues. In this example one league is likely a subset of the other, given that the Dallas Cowboys are a team that plays in the NFL. This is merely provided for exemplary purposes and not meant to be limiting in any way. Also, skilled artisans will appreciate that one or more features of the aforementioned example may be selectively disabled, as may be desired or required by any regulation, policy, or law of an environment in which the invention may be operated.

In some embodiments of the invention, to make a created bet available to multiple leagues the second or subsequent league, the user must be a subset of the primary league. In other embodiments of the invention there may be no requirement that a second or subsequent league be a subset of the primary league selected. For example, in one version of the invention a created bet can be made available for the Dallas Cowboy fan league and also simultaneously available to another league comprising fans living in Florida. Skilled artisans will appreciate that the preceding embodiments have been provided as examples only, and without limitation.

The user creating the new bet may also need to determine whether to allow counteroffers 415. A counteroffer may come into play when a user has reviewed a created bet and then wishes to make changes to the bet. Allowing counteroffers is an optional feature of the system according to an embodiment of the present invention. If the bet creator wishes to allow counteroffers, then conditions defining the counteroffers may be set to define the terms 420 under which a counteroffer may be made. Alternatively, the bet creator may allow for any and all counteroffers to be made. The present invention contemplates that although a bet creator does not allow for counteroffers, there may be a mechanism under which the user, i.e., someone viewing the bet created by the bet creator, may submit a counteroffer to the bet creator. It is also contemplated that the user may view a bet posted by a bet creator, and offer the same bet to others with the same, or different terms. In such a case, the user may then become the bet creator, i.e., the user becomes a bet creator by virtue of posting the bet of another. In an embodiment of the present invention, the bet may be posted to a database to be subsequently retrieved from the database and viewed by a user that may consider confirming or negotiating the bet. The database may be included in a computerized device, which will be described in greater detail below along with FIG. 9.

The bet creator may also select the sport 425 and whether the bet may be a player bet or team bet 430. The team bet may be related to a fantasy team, which may comprise a collection of players selected by the user to be included in the team. In the event that a team bet is selected the user preferably identifies the team 470 and determines whether the bet may be a total team points bet 475 or not. A total team points bet is one in which all of the players on the selected team may have their fantasy points totaled. When the team bet is not a total team bet it may be necessary for the bet creator to identify two or more players 480 that make up a subset of the team for the purpose of the bet. Players can be specifically selected, or a group of similarly defined players may be selected for a subset-team bet. For example, if the bet creator would like to select several players from the Dallas Cowboys, for example, then a selection of Tony Romo (QB), Demarco Murray (RB) and Laurent Robinson (WR) may be selected. The user may also include any number of players from additional teams within the sport associated with the league. The total points scored by Romo, Murray and Robinson may be added together in order to determine to total fantasy team points. In this example, the three players selected all play different positions, which may be the case but does not necessarily have to be the case. Alternatively, the bet creator may select all wide-receivers for the Dallas Cowboys, thus making a position bet. In the position bet scenario the fantasy points scored by all of the players from that position, in this example wide-receivers, would be totaled to determine the score.

Other subset-team bets may become rather exotic, such as all players wearing #80 through #89, for example. Still further, subset-team bets could identify a subset of players adding their score in a particular, defined interval of the game they play. The following example is related to a bet for the sport of football, and the related terminology will be apparent to those skilled in the art of football. For example, the scores for players Romo, Murray and Robinson, along with scores from additional players from other teams, could be added together for the fourth quarter. It may also be possible to define different players over different intervals. For example, a user, which may be a creator, may notice that player Dez Bryant seems to catch more passes earlier in the game, so the user may select players Rome, Murray and Bryant for the first quarter and Romo, Murray and Robinson for quarters two, three and four. Skilled artisans will appreciate that one or more features of the aforementioned example may be selectively disabled, as may be desired or required by any regulation, policy, or law of an environment in which the invention may be operated.

Still further, the user may mix and match players from different teams, selecting players Romo, Murray and Robinson for the first half, while selecting players from other teams in the same sport, such as, for example, Aaron Rogers (QB), James Starks (RB) and Jordy Nelson (WR) for the second half. Still further, in this most immediately preceding example the players in the first group may match up with the players in the second group by position. Although this is still just another example, those skilled in the art will appreciate that alternate (and possibly infinite) other combinations remain possible. Perhaps, also for example, a user may believe that the Green Bay Packers running game is not very good. The user may wish to group Aaron Rogers with two wide-receivers: Jordy Nelson and Greg Jennings, or other wide receivers from other teams.

In the event that a bet creator selects a player bet type, the player(s) may be selected 435. In this scenario the bet creator may select either a single player or multiple players. In the multiple player selection, players subject to the bet that may form a grouping may not need to be on the same professional team. Alternatively, as illustrated in the previous team bet scenarios, a user's fantasy team may include a number of players on the same professional team. The user may also manage multiple fantasy teams. Here a user, which may be the bet creator, may select one or more player from his or her fantasy teams, which may include players from different or the same professional teams. The terms and aspects of the bet, among a myriad of other terms and conditions, may be selectable by the creator of the bet and negotiable by additional users.

While there is no particular requirement that the selection of team bet or player bet must be made first, in both scenarios it is possible for the bet creator to set the amount of the bet 440, the type of bet 445, method of scoring 450, bet duration 455 and whether to give points or odds 460 are available to be made. If any particular bet parameter is not set, or offered, the default may be incorporated. This default may be set by a moderator, administrator, and/or league creator. In some versions of the invention, the bet creator may select or input one or more of the following: the amount of the bet 440, the type of bet 445, method of scoring 450, bet duration 455 and whether to give points or odds 460 are available to be made.

Returning to the type of bet, or bet type 445, there are a variety of options available. The typical bet may select a straight point total bet type, whereby the statistic to be subject to the bet includes the points accumulated in the sporting event. As an example of a point total bet follows, Player 1 may be compared with the points accumulated by Player 2, with the highest point total being declared the winner. Alternatively, in some versions of the invention the bet type can declare the winner as the fantasy team with players that have accumulated the fewest points, which recognizes that sometimes it is more challenging to pick players that may fail and score fewer points. In this "fewest points is the winner" scenario the universe of players that can be selected could optionally be a closed set of pre-determined players, which could be set by the creator of the bet or could be set by an administrator, moderator or creator of a league. For example, the league creator could post a fewest points bet defining a closed set of players. An example is provided as follows, wherein set is closed to five players and the selected players are Tom Brady, Aaron Rogers, Cam Newton, Adrian Peterson and Calvin Johnson. The league creator may also set the bet to avow a minimum number of players, up to the number of players in the closed set. For example, in a procedure similar to a draft, as will be understood by those of skill in the art, the league creator may define a maximum of six (an arbitrarily selected number) users allowable to place a bet on the line, which may each select a player that has not yet been taken by anyone else. In an additional embodiment, players may be selectable by multiple users in a bet. This selection may be repeated. In this example, a bet may be finalized once the users have selected his or her players and negotiated the terms relating to the bet. The league creator and/or moderator may or may not actually participate in the bet.

As with the aforementioned example, it is contemplated that some of the bets placed in some versions of this invention may include more than two parties. In fact, it is contemplated that the present invention could be deployed as a module that could be added on to a typical fantasy sports league. In the typical fantasy sports league, there may be some kind of a draft followed by weeks of regular season play and playoffs. Typically leagues may play head-to-head schedules against an opponent and achieve victories or suffer defeats at the hand of a single opponent in any given week. However, skilled artisans will appreciate additional scoring and/or matching making structures to be included within the scope of this disclosure. To spice up the league and offer additional play or betting options each team could select one or more players from their roster as the player who they believe may score the most points (or conversely the fewest points). All other players could identify the player or players, which may include offering the opportunity for fantasy owners to compete against all teams in the league in any given week. In still further embodiments wherein users may manage a fantasy team in a league ("fantasy owners"), such a subset of fantasy owners, could select one or more of their players and create a bet with one or more other fantasy owners relative to who may score the most points (or conversely the fewest points).

With respect to selecting the scoring setting 450, in order to objectively award points to the player, players, teams or team sub-sets selected it may be beneficial to identify a scoring platform. There may be any number of scoring platforms that could be used. For example, a scoring platform could be tied to an existing, defined and certain third party scoring system, such as, and without limitation, a scoring platform employed by a ESPN standard fantasy league. A customized scoring platform could also be created by the administrator, moderator or a league creator. Still further, the bet creator could customize a scoring platform, either from scratch or working to modify some default scoring platform embedded in the system or created by a league creator, for example. Skilled artisans will appreciate additional configurations of scoring platforms to be included within the scope of this disclosure.

With respect to modifying the bets type 445, there are a number of different bets that can be placed, including but not limited to: (1) most total points being declared the winner; (2) least total points being declared the winner; or (3) an over-under bet. The over-under bet may be associated with a fantasy team, which may leverage the skill of a user in determining an outcome relating to the sporting event. With respect to the last type of bet, an over-under bet, the bet creator may indentify one or more players, teams or team sub-sets and also select or input a specific point total or point range, selecting either that the selected player, players, team or team sub-set may score over or under that total or range. For example, a first user may select players Jason Witten and Dez Bryant, setting a certain number, say 25 points for the present non-limiting example, as the over-under number and takes over. This means that the first user thinks the combination of Witten and Bryant may score over 25 points, making the bet attractive to a second user who thinks that they may combine for under 25 points. As with any bet a tie can be considered a push, where neither the bet creator or other users may win and nor lose. Alternatively, a push may be considered a loss for both players, in which case the proceeds from both players could be routed to the system administrator, put into a pot of money for a drawing or award, allocated to a third party, or even donated to charity. In the event that the number selected is not a whole number but includes a fraction of a point, under most typical scoring methods that would ensure against a tie. Skilled artisans will appreciate that one or more features of the aforementioned example may be selectively disabled, as may be desired or required by any regulation, policy, or law of an environment in which the invention may be operated.

Another example of the over-under bet contemplated by the present invention may involve ranges. A league creator or system administrator may create an over-under bet where one or more players are selected. We may again use Jason Witten and Dez Bryant. The range is set to between X and Y, say between 23 to 27 combined points. The first user may take the over, the second user may take the under, leaving a broad range between 23 and 27 points that would result in a tie. In still another variation of a range bet, although not employing a typical over-under approach, would be for a bet to be created where the creator thinks Witten and Bryant may combine for somewhere between A to B points, say 20 to 30 points. The bet creator, the first user, may take that range and the player accepting the bet, the second user, would receive both the under and the over, so if the combination of Witten and Bryant scored 19 or less or 31 or more, the second user would be declared the winner.

With respect to bet duration 455, the creator of the bet can select how long the bet may remain active, which may include defining its duration and/or expiration. For example, a bet can be created that is a recurring bet. With professional football games are played on a week to week basis, so a bet could stand week to week until canceled by the bet creator. The bet could, however, lock in place at the start of play for the first player a part to the bet, at which time no additional changes or modifications to the bet would be allowed. For example, if a bet has not been confirmed prior to the commencement of the subject sporting event in any given week, such as by an initial play, the bet may be declared a nullity. Like other settings, however, the bet creator may leave the bet open for any period, which could in some versions even allow for a bet to become finalized after the sporting event or a play has commenced. Additionally, the duration of the bet may be defined relative to a specific time period, such as, for example, a quarter, a drive, or a play. The duration may optionally be lengthened and/or shorted by a user, such as the bet creator. Skilled artisans will appreciate that one or more features of the aforementioned example may be selectively disabled, as may be desired or required by any regulation, policy, or law of an environment in which the invention may be operated.

Ultimately, after the parameters of the new bet have been set, either by the creator of the new bet or through application of default settings, or through a combination of user selection and default setting, the new bet is submitted 490. From here the new bet can immediately go live, for example, by being posted to a database, or it can be held in a moderation queue pending review by the administrator and/or a league creator.

FIG. 5 shows a detailed view of options for responding to messages. Quickly recalling FIG. 3, for example, there are a variety of reasons for communicating a message, such as a message to the bet creator 365. There are also, of course, reasons to communicate a message to a user that has accepted a bet or is in negotiations with the bet creator through the counteroffer functionality.

FIG. 5 starts 512 with a user logging into the system 515 to gain access to the site and opening up the user's account information. As with many systems, users can message each other in a variety of ways. FIG. 5 relates specifically to the communication of electronic messages that convey information pertinent to or related to a bet that may have been confirmed/finalized or one that is under current negotiations. First the user may notice whether they have any messages through an alert, such as a visual cue or pop-up message 518. In the event there are no messages that require the attention of the user he or she may proceed, here returning to FIG. 3, node 315. Of course, there is no requirement that any user respond to messages first without proceeding; the user has the ability to elect to respond to messages or ignore them. In the event that the user does wish to respond to a message he or she may go to the message portion of the system where messages can be displayed in a variety of ways.

There may be a plurality of different message types and/or alerts. In the interest of clarity, four different types of messages or alerts will now be discussed: (1) bet confirmations; (2) questions to answer relative to a bet; (3) counteroffers to review; or (4) alerts sent by the administrator or the creators of any leagues joined.

Wherein there may be a bet confirmation 520, the user may reply 525 and seek to revise the finalized bet 530. If no revision of the bet is sought then the reply message may be a friendly, sportsman like message or perhaps some sort of smack talk 533. Modifying a previously finalized bet is discussed infra.

If there are questions to answer 540, the user may respond 543 by, for example, submitting the response 550 with the message communicated back to the sender of the question 580. If there is one or more counteroffer to review 546, the bet creator, which may be a user, may choose to accept or decline the counteroffer 553. When the creator accepts the counteroffer the bet is finalized and a message is communicated back to the user who provided the counteroffer 580. If the counteroffer is not accepted, the creator may make a subsequent counteroffer 567. The subsequent counteroffer 567 may be submitted 570 and communicated 580 to the user. If the counteroffer is not accepted and no counteroffer is made, the user may ask a question 573 for clarification or other purposes, which may be submitted 576 and communicated 580. Where a counteroffer is not accepted 553, not subject to a counteroffer 567 and no question is asked 573, the counteroffer may be declined 570 and an alert or message may be communicated 580, for example, using an interface.

Figure 6:
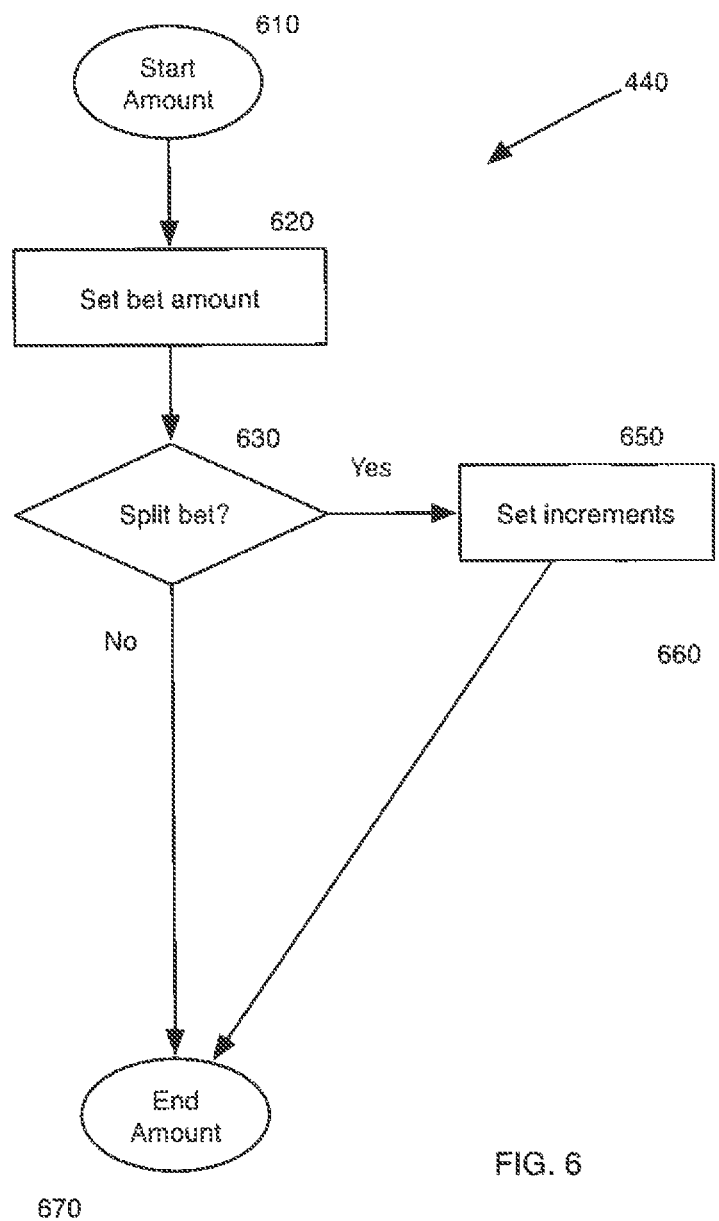
FIG. 6 shows an overview of the bet splitting feature according to an embodiment of the present invention.

FIG. 6 shows a particular variation on the process for setting the bet amount, referred to in FIG. 4 at 440. The amount routine starts 610 with the setting of the bet amount 620. The bet creator may be prompted to determine whether they wish to split the bet 630. Splitting a bet refers to whether a bet must be completely taken in full or whether an accepting user can select to take a portion of the bet. For example, Player 1 has created a bet in the amount of $1,000. Player 2 likes the bet but simply cannot afford to bet $1,000, If Player 1, the creator of the bet, allows the bet to be split then Player 2 could accept a portion of the bet, for example $100. In this scenario Player 1 would have only 10% of the bet accepted, so even after acceptance the bet would remain unfilled relative to the remaining 90%, in this case $900.

Where the bet may be split, the bet creator may set minimum (or even maximum) increments for bet splitting 650. For example, Player 1 wishes to bet $1,000 and doesn't want to receive 1000 different bets, so Player 1 might set the minimum bet increment at $50. This minimum bet increment could also be set as the increment for all bet segments, or in other words all bets may be a multiple of the minimum bet increment. However, skilled artisans will appreciate that bets may be made without a minimum bet increment in additional embodiments. Likewise, Player 1 might elect to set a maximum increment, preventing another player from selecting to take 95% of the bet, thereby making the bet unattractive for others.

Figure 7:
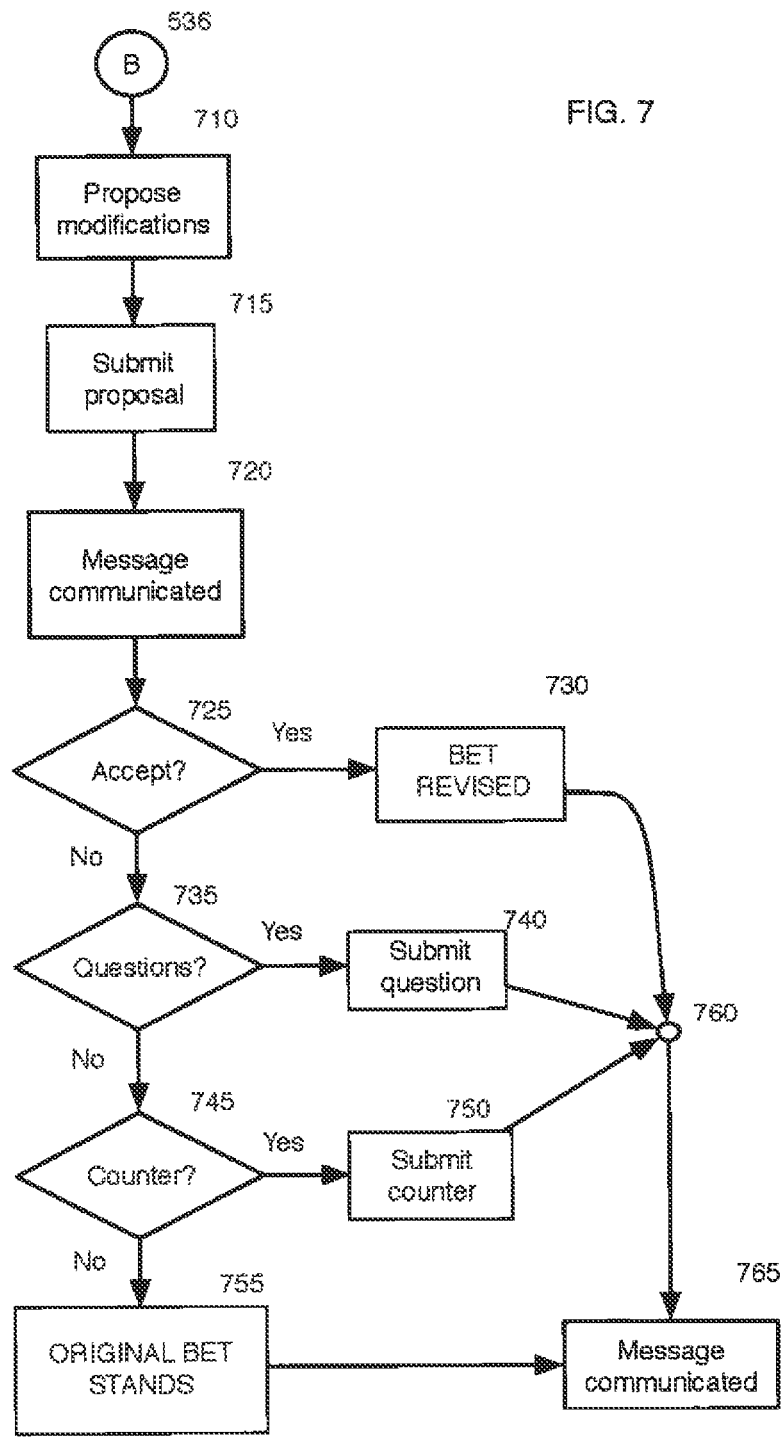
FIG. 7 shows an overview of the revise a bet feature according to an embodiment of the present invention.

FIG. 7 shows the process for revising a previously finalized bet, according to an embodiment of the present invention, picking up where FIG. 5 node 536 left off. Given that the bet has been finalized, in order to revise a bet there must be an agreement between the users subject to the bet, for example, prior to some specified time or in no event later than the start of play. In some versions of the invention a bet revision may require the authorization of an administrator, moderator and/or the creator of the league or leagues where the bet has been posted.

A proposed modification 710 is submitted 715 and a message communicated 720. If the proposed modification is accepted 725 then the bet is revised 730 and re-finalized, with re-finalized bet or a message containing the re-finalized bet being communicated 765 to the other party. Alternatively, not shown, prior to the negotiated and revised bet being confirmed, an optional step or steps may include moderating the revisions and/or negotiations by a system administrator, a moderator and/or the creator of the league. Still further, a system administrator, a moderator and/or the creator of the league may, in some versions, be petitioned for approval to review and/or revise the proposed counteroffer to the bet even before the negotiation may be initiated with the bet creator.

In the event that the proposed revision is not accepted 725 questions may be asked 735 for clarification or other purposes, which may then be submitted 740 with the question or a message containing the question being communicated 765. If the revised bet is not accepted and there are no questions the user being asked to revise the bet may make a counteroffer themselves 745, which is submitted 750 with the counteroffer or a message containing the counteroffer being communicated. In the event that revised bet is not accepted 725, there are no questions 735 and there is no counteroffer 745, the original bet stands unmodified 755, with a message being communicated 765.

Figure 8:
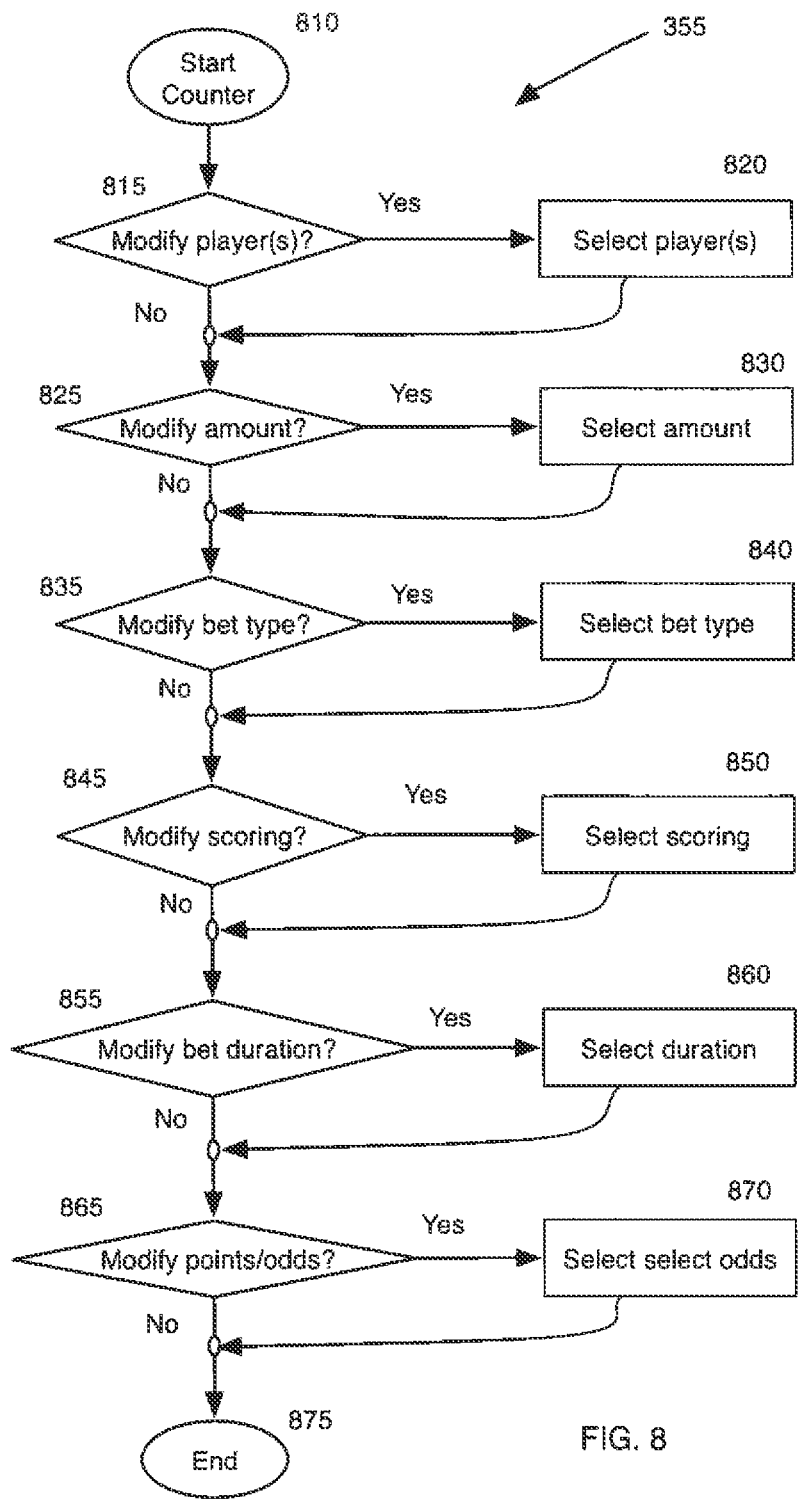
FIG. 8 shows a detailed view of the counteroffer functionality according to an embodiment of the present invention.

FIG. 8 a detailed view of the counteroffer processes, according to an embodiment of the present invention. In the event that a counteroffer is made, whether by a user other than the bet creator or the bet creator in the form of a counter-counteroffer, there are a variety of bet parameters that can be the subject of a counteroffer proposal. One or more of the following may be the subject of a modification, without limitation, that would invoke the counteroffer process: (1) modified player, players, teams or sub-set team 815; (2) modify the amount bet 825; (3) modify the type of bet 835; (4) modify the scoring method or platform selected 845; (5) modify the bet duration 855; and/or (6) modify whether points are given or odds provided 865. Where the scoring method or platform is modified it can be modified in total, swapping out one scoring platform for another, or modified in one or more parts, for example changing the scoring of a touchdown passed by a quarterback from the ESPN standard 4 points to 6 points. Any number of scoring criteria can be modified when making a counteroffer.

In some versions of the invention the counteroffer could take the form of a conditional acceptance of the bet. For example, the user who makes the counteroffer could conditionally accept the bet, locking themselves into a bet provided the other user agrees to the one or more modifications to the created or proposed bet. For example, Player 1 may create a bet by selecting ESPN standard fantasy as the scoring method that may be used to assign points to the one or more players associated with the bet. Player 2 reviews the created bet and wishes to conditionally accept the bet, agreeing to all of the various bet parameters except for using ESPN standard fantasy scoring. Short of accepting the bet and with the condition of ESPN standard fantasy scoring, Player 2 may initiate communication or negotiation with the bet creator. As an example, several options are provided as follows, without limitation: (1) send a question to the creator of the bet to see if a different scoring setting would be agreeable; (2) send a counteroffer to the creator of the bet modifying the scoring method; or (3) conditionally accepting the bet subject to the bet creator accepting a different method of scoring. In the conditional acceptance scenario, Player 2 has locked themselves into the bet if Player 1 agrees to the modified scoring method, which would result in a confirmed bet. This third scenario is different than the counteroffer scenario because in the traditional counteroffer scenario the counteroffer could be canceled at any time up until it is accepted. With these illustrative three scenarios, any bet can be canceled upon until it is accepted unless a conditional acceptance is selected. In some versions of the invention it is possible to waive revocation of a bet, resulting in a bet remaining open for acceptance until a trigger date or event.

As previously mentioned, the invention contemplates the creation of leagues, which can either be done by an administrator, moderator or an individual user who wishes to start his or her own league. When a user creates a league several choices are available, some examples of which will follow. The user may elect to create either to make it private or public league, for example. A private league condition membership by using one or more membership restrictions. A private league may also be password protected to ensure that only members of the private league have access. Alternatively, access to the league may be private and open for viewing but require membership in order to create a bet, accept a bet or make a counteroffer. Of course, it may be necessary to somehow invite members to a private league, such as through sending an invitation through the system (i.e., message, alert, electronic message, chat, selection from friends list, entering user name, etc.) or otherwise in the real world. Private leagues may also choose to make themselves available for applications to join if they wish.

A public league may not ordinarily be password protected, but may be restricted in some circumstances, for example where a public league is created but only those who are registered users are given access to join and/or to view. In some versions of the invention, the creator of a public league can choose to limit those that are allowed to join to those who satisfy certain desired criteria, which may be defined by membership restrictions, for instance, location, age, bettor ranking or other specifications. The creator of a public league also has the option for the league to allow automatic importing of league specifications from system databases. In versions of the invention where leagues automatically update from system databases with roster moves, standings, league settings, and scoring system and more may be automatically updated in real time. In some versions of the system this real time automatic updating can be delayed by a predetermined amount of time, if desired.

The creator of a league, whether public or private, may make additional determinations to control the league, for example, and without limitation, whether multiple users in the league are allowed to have the same player, for example. In some versions of the invention the league creator, whether private or public, can set default parameters for the bets that can be placed within the league. For example, the league creator may dictate the scoring settings, players available, minimum number of players that can be grouped in a bet, the maximum number of players that can be grouped in a bet, the bet type, bet duration and/or whether points or odds may be given. In some versions one or more of the defaults selected by the league creator may be modified by either the bet creator or the accepting/counteroffering user. Where the league creator has mandated the bet criteria and the league does not allow for variations, bets could only be created in multiple leagues where all leagues allow for the same betting criteria (sometimes referred to as parameters herein).

The league page, once created, may have a plethora of information available. There may be a league message board, along with a chat channel where anyone logged in on the site that's a member of a league may talk. Actual league standings and complete rosters may be accurately available if auto import is allowed, or a league creator/moderator updates them. A user may be able to view bets relative only to your league, past and current on the league section of the site. Also, the wish-list for each user in the league may be viewable along with your own when viewing their team page. The league page may also include, or provide access to, the statistics relating to the sporting event that may be subject to the bet.

There may also be a comprehensive betting statistics section that may show all kinds of statistics relative to, and exclusively from bets made amongst those in the league against those in the league, including, but not limited to, profitability of each user, and amount bet. A user may also view general betting statistics for each user, which may be openly available to all users on the site. A team, which may be associated with a user, may have starting positions, and a bench consistent with your league if you auto import, or what your league creator set. For example, a user's starting players may be used as subject to the bet if a team bet is created and/or accepted. A first user's bench is for players not in another user's starting lineup, but still on the first user's roster (mostly used in imported leagues). Now auto import may allow a first user's current starters from his or her league host page to initially show up when he or she creates or view a team bet, unless the user chooses to modify them. If auto import isn't selected, a user may be required to set his or her starting players. When the user looks at a team, statistics may be available for certain criteria on how well those players performed in bets. Also the user may create teams for use in betting of whatever players the other user may choose, as to simplify the process of creating, and accepting bets. Also real teams are available to involve in bets, not only created teams (except a real team you cannot remove players from) but a user can add players to the bet.

Another aspect of some versions of the invention allows for user to be ranked based on performance criteria established either by an administrator, moderator or league creator. All or some of the performance criteria used to rank users can be modified, and can be customized by a league creator. In the scenario where there is a customized league performance criteria this can be in addition to the default league performance criteria, which may allow leagues to set up their own ranking structure but also ensure that each player in that league has a unique performance rank capable of being used to compare players across the entire platform whether or not they are a participant in one or more of the same leagues.

The performance based ranking is called the "bettor ranking," and may be performed by a performance based ranking system. The performance based ranking system may be operated on a computerized device, an example of which will be described below in relation to FIG. 9. The ultimate bettor ranking is assigned after the bettor's accumulated weighted points compared with the accumulated weighted points of other users, such as, for example, being ordered from most to least. The following embodiment is provided in the interest of clarity, to illustrate one series of calculations to determine bettor rankings. Skilled artisans will appreciate that a vast number of additional calculations may be designed and implemented to determine weighting of points, ranking, and other factors that may be used to operate a performance based ranking system, after having the benefit of this disclosure.

In one embodiment the bettor ranking the bettor's weighted points (BWP) are determined using the following formula:

$$BWP=(Total\ Points)(Winning\ Percentage)(Profitability\ Percentage)$$

In certain embodiments, when a bet is placed the amount of the bet can be categorized into different tiers determined by how much the user wagered. Each higher tier may be allocated more points toward the bettor ranking. The tier amounts are subject to modification, but in one version of the invention they stand as:

Tier 1 is bets less than $20.
Tier 2 is bets $20-$99.99.
Tier 3 is bets $100-$399.99.
Tier 4 is bets $400$999.99.
Tier 5 is bets of $1,000 or greater.

The next step in calculating the bettor ranking is to allocate a score based on a particular win. In one embodiment a winning bet equals 2.0 and a losing bet=1.5, thus ensuring that every user may achieve some rank based on even a losing bet.

To illustrate one particular embodiment of the bettor ranking, which utilizes the above formula, let's turn to an example. Player 1 bets Player 2 $40 that Demarco Murray may rush for more yards than Frank Gore. Gore out rushes Murray so Player 1 loses the bet and receives 2.25 total points, and Player 2 is receives 4.00 total points.

In calculating the bettor ranking using this particular formula it is also necessary to factor the winning percentage. Winning percentage is determined by the total amount of bets won divided by the total amount of bets made.

In calculating the bettor ranking using this particular formula it is also necessary to factor the profit percentage, which is determined by total amount won divided by the total amount wagered.

As per this particular illustrative formula, to obtain the BWP total points, winning percentage and profit percentage are multiplied together giving the user a BWP score. With respect to the current example, if the only bet placed by both Player 1 and Player 2 had been the Murray-Gore bet then Player 1 would have a BWP of 4×100%×$40/$40=4. Player 2 would have a BWP of 2.25×0%×$0/40=0. If only Player 1 and Player 2 were in the universe of players to be ranked then Player 1 would have a rank of #1 and Player 2 would have a rank of #2.

The bettor ranking can be used to rank users against every other user's score and ordered to give that user a rank out of all active players. This formula can be used to see a player's official, overall rank, but can also be used to calculate specific bettor ranking sub-sets, such as a bettor ranking for a particular sport, any particular, defined time period (i.e., week, month, quarter, season, 5 game stretch, etc.), or for any type of bet.

While the present invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

It should also be noted that at various times flowcharts and textual discussion of what the flowcharts show may progress in a linear fashion. An order of processes is not material to the invention, nor should any order be considered limiting unless order has been specifically and unambiguously identified as being required. For example, with respect to FIG. 4, there is no reason that the individual creating a new bet could have to first set availability 410 before determining whether to allow a counteroffer 415, or even whether the bet may be a player bet or a team bet. Similarly, with respect to FIG. 8, for example, there is no reason that the user seeking to make a counteroffer must first determine whether to modify one or more players 815 before determining whether to modify the amount 825. In this sense the flowcharts and accompanying textual description show the processes or subroutines that together comprise one particular embodiment of the fantasy sports online betting and wagering system.

In the interest of clarity, not all of the routine features of the implementations described herein have been shown and described in meticulous detail. However, it will be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps, and/or data structures may be implemented using various types of operating systems, computing platforms, computer programs, and/or general purpose machines. In addition, after having the benefit of this disclosure, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The fantasy betting application, according to an embodiment of the present invention, may include a computerized device that requires the performance of one or more steps to be carried out on or in association with a computerized device. A person of skill in the art will appreciate that the computerized device may include, but not be limited to, a server, a computer (i.e., desktop computer, laptop computer, netbook, iPad, or any machine having a processor), a dumb terminal that provides an interface with a computer or server, a personal digital assistant, mobile communications device, such as a mobile phone, smart phone, or other similar device that provides computer or quasi-computer functionality, a mobile reader, such as an electronic document viewer, which provides reader functionality that may be enabled, through either internal components or connecting to an external computer, server, or global communications network (such as the Internet), to take direction from or engage in processes which are then delivered to the mobile reader. It should be readily apparent to those of skill in the art, after reviewing the materials disclosed herein, that other types of devices, individually or in conjunction with an overarching architecture, associated with an internal or external system, may be utilized to provide the "computerized" environment necessary for the process step to be carried out in a machine/system/digital environment. It should be noted that the method aspects of the present invention are preferably computer-implemented methods and, more particularly, at least one step is preferably carried out using a computerized device.

Figure 9:
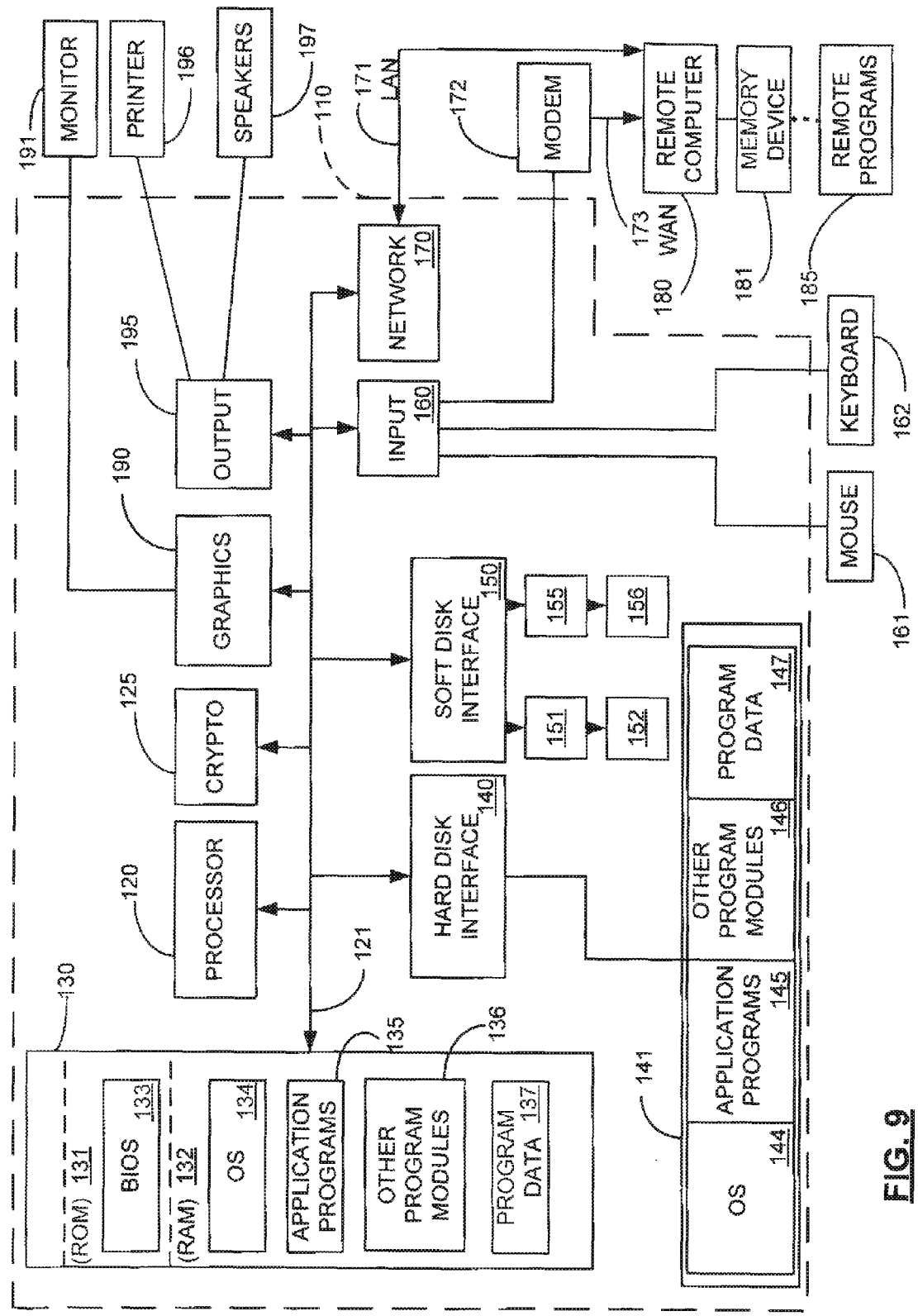
FIG. 9 shows a block diagram of an illustrative computer to operate the fantasy betting application according to an embodiment of the present invention.

FIG. 9 illustrates a computing device in the form of a computer 110, which is capable of performing one or more computer-implemented steps in practicing the method aspects of the present invention. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 110 may also include a cryptographic unit 125. Briefly, the cryptographic unit 125 has a calculation function that may be used to verify digital signatures, calculate hashes, digitally sign hash values, and encrypt or decrypt data. The cryptographic unit 125 may also have a protected memory for storing keys and other secret data. In other embodiments, the functions of the cryptographic unit may be instantiated in software and run via the operating system.

A computer 110 typically includes a variety of computer readable media. Computer readable media can be any available media that can be accessed by a computer 110 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 9 illustrates an operating system (OS) 134, application programs 135, other program modules 136, and program data 137.

The computer 110 may also include other removable/non-removable, volatile/nonvolatile computer storage media. By way of example only, FIG. 9 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives, and their associated computer storage media discussed above and illustrated in FIG. 9, provide storage of computer readable instructions, data structures, program modules and other data for the computer 110. In FIG. 9, for example, hard disk drive 141 is illustrated as storing an OS 144, application programs 145, other program modules 146, and program data 147. Note that these components can either be the same as or different from OS 134, application programs 135, other program modules 136, and program data 137. The OS 144, application programs 145, other program modules 146, and program data 147 are given different numbers here to illustrate that, at a minimum, they may be different copies. A user may enter commands and information into the computer 110 through input devices such as a keyboard 162 and cursor control device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 9. The logical connections depicted in FIG. 9 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 9 illustrates remote application programs 185 as residing on memory device 181.

The communications connections 170 and 172 allow the device to communicate with other devices. The communications connections 170 and 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

According to an embodiment of the present invention, a fantasy betting application is disclosed, which may be capable managing bets using an interface. A fantasy betting application, according to an embodiment of the present invention, may be creatable using, for example, but not intended as a limitation, Microsoft's Visual C# .NET development environment. Such a computer program product 10 would be suitable for execution on a computer 110 having, for example, but not intended as a limitation, one of Microsoft's Windows family, Google's Android, or Apple's Mac OSX family of operating systems loaded into memory 134. A person having skill in the art, after having the benefit of this disclosure would recognize that many other development platforms might be used to create a fantasy betting application, which may be executable with many other operating systems, but that still embody the present invention. As such, the following disclosure is provided merely for explanatory purposes and should in no way limit the present invention to fantasy betting applications 10 that are created using the aforementioned development platform or for use with the aforementioned operating systems.

In the foregoing claims, a series of elements may be preceded by the phrase "at least one of." This style for listing elements is intended to define a list of elements from which, one element, a combination of elements, or all elements may be selected. The list preceded by "at least one of" is not intended to solely require at least one of every listed item.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A method for managing a simulation sports game relating to statistics of a sporting event using a fantasy betting application, wherein the fantasy betting application comprises rules managed by a rules engine and stored in a database included in a computerized device with a processor and memory, the method comprising:
   creating a bet to define a created bet by
      defining conditions of the bet including a bet duration and a negotiations setting,
      defining terms of the bet including a bet amount and a bet subject relating to the sporting event and comprising at least one of a team, a position, a play, and a player, and
      defining limitations of a counteroffer, wherein the negotiations setting selectively controls allowance of the counteroffer and wherein the limitations of the counteroffer include a range of allowable values corresponding to the terms of the bet;
   posting the created bet to define a posted bet by
      authorizing the created bet for posting by selectively analyzing the created bet for compliance with the rules stored in the database, and
      displaying, upon determination of compliance with the rules, the terms of the created bet using a first interface;
   creating the counteroffer to define a created counteroffer by
      selectively negotiating terms of the counteroffer by transmitting a question related to the created bet and receiving a respective response related to the question,
      defining conditions of the counteroffer including a counteroffer duration,
      defining the terms of the counteroffer, wherein the terms of the counteroffer are selected from the limitations of the counteroffer, and include a counteroffer amount and a counteroffer subject relating to the sporting event and comprising at least one of a team, a position, a play, and a player;
   posting the created counteroffer to define a posted counteroffer by
      authorizing the created counteroffer for posting by selectively analyzing the created counteroffer for compliance with the rules stored in the database, and
      displaying, upon determination of compliance with the rules, the terms of the created counteroffer using a second interface;
   initiating the simulation sports game to define a confirmed bet by
      receiving acceptance of one of the posted bet and the posted counteroffer, and generating an alert indicating receipt of the acceptance of the one of the posted bet and the posted counteroffer;

wherein the rules comprise allowance criteria for at least one of a bet value, a bet type, and scoring procedure;

wherein the bet value defines criteria for valuation of winning the simulation sports game;

wherein the bet type defines criteria for determining a winner of the simulation sports game;

wherein the scoring procedure defines a measurement of the statistics of the sporting event using the criteria for determining the winner of the simulation sports game wherein the steps of creating the bet, posting the created bet, creating the counteroffer and posting the created counteroffer are carried out using the computerized device.

2. A method according to claim 1 wherein a user is associated with user data to identify information relating to the user, wherein a league is definable to include members selected from a group of users, and wherein the league is configurable to include membership restrictions relating to the user data of each user in the group of users.

3. A method according to claim 2 further comprising comparing the user data with the membership restrictions to determine eligibility of the user for admission into the league and wherein the alert is generated to indicate the eligibility.

4. A method according to claim 2 wherein the league includes a moderator to selectively analyze one of the created bet and the created counteroffer with the rules in the database for compliance with the rules to determine whether the simulation sports game is approvable as the confirmed bet, the moderator being associated with the league.

5. A method according to claim 1 wherein a user is included in a group of users, wherein a community interface is included to selectively share user data associated with the user with additional users in the group of users and to provide intercommunication among each user in the group of users, wherein at least part of the user data is selectable between being privately held and publicly shared, wherein the user data that is publicly shared is comparable by each user with at least one other user in the group of users.

6. A method according to claim 1 wherein a user is included in a group of users, wherein a performance based ranking system is included to provide a ranking of each user against the group of users, wherein operation of the performance based ranking system comprises:
defining the rules to assign weighted points to the confirmed bet relating to the terms of the confirmed bet and an outcome of the confirmed bet;
wherein the ranking is defined by an accumulation of the weighted points, and wherein the ranking is associated with the user;
comparing the confirmed bet made by the user to the rules to determine a number of weighted points to be added to the accumulation of weighted points of the user;
comparing the accumulation of weighted points of the user to the accumulation of weighted points of additional users within the group of users to determine the ranking of the user among the users in the group.

7. A method according to claim 1 further comprising selectively allowing the created bet to be split and selectively requesting the created bet to be split, wherein splitting the created bet is defined as allowing parts of the created bet to be independently confirmable.

8. A method according to claim 1 wherein the statistics relating to the sporting event are included on a network connected device to be accessed by the fantasy betting application.

9. A method according to claim 1 further comprising selectively defining an expiration of the created bet.

10. A method according to claim 1 further comprising acquiring approval for one of the created bet and the created counteroffer from a moderator prior to the simulation sports game being confirmable, wherein the moderator compares the one of the created bet and the created counteroffer with the rules for compliance to determine whether the simulated sports game is approvable, and wherein the alert is generated to indicate whether the simulated sports game is approvable.

11. A method according to claim 1 further comprising accepting funds for the confirmed bet, holding the funds until the winner of the simulated sports game is determined, and dispersing at least part of the funds to the winner of the simulated sports game after the winner is determined, wherein the funds to be collected are defined by the terms of the confirmed bet, wherein disbursement of the funds to the winner is defined by the conditions of the confirmed bet, and wherein a fee is collectible from the funds prior to dispersing remaining funds to the winner.

12. A method for managing a simulation sports game relating to statistics of a sporting event using a fantasy betting application wherein the fantasy betting application comprises rules managed by a rules engine and stored in a database included in a computerized device with a processor and memory, comprising:
creating a bet, the bet being created by a creator to define a created bet, by
defining conditions of the bet including a bet duration and a negotiations setting,
defining terms of the bet including a bet amount and a bet subject relating to the sporting event and comprising at least one of a team, a position, a play, and a playert, and
defining limitations of a counteroffer, wherein the negotiations setting selectively controls allowance of the counteroffer and wherein the limitations include a range of allowable values corresponding to the terms of the bet,
posting the created bet to the database to be receivable from the database and viewable by a user using an interface;
creating the counteroffer, the counteroffer created by the user to define a created counteroffer, by
selectively negotiating terms of the counteroffer by transmitting to the creator a question related to the created bet and receiving from the creator a respective response related to the question,
defining conditions of the counteroffer including a counteroffer duration
defining the terms of the counteroffer, wherein the terms of the counteroffer are selected from the limitations of the counteroffer, and include a counteroffer amount and a counteroffer subject relating to the sporting event and comprising at least one of a team, a position, a play, and a player;
initiating the simulation sports game to define a confirmed bet by
receiving one of acceptance by the user of the posted bet and acceptance by the creator of the posted counteroffer, and
generating an alert indicating receipt of the acceptance of the posted bet or the posted counteroffer, wherein the alert is receivable using the interface;

accepting funds for the confirmed bet;
holding the funds for the confirmed bet until the winner of the simulation sports game is determined; and
dispersing at least part of the funds to the winner of the simulation sports game after the winner is determined;
wherein the funds to be collected are defined by the terms of the confirmed bet;
wherein disbursement of the funds to the winner is defined by the conditions of the confirmed bet; and
wherein a fee is collectible from the funds prior to dispersing remaining the funds to the winner;
wherein the user is included in a group of users;
wherein a community interface is included to selectively share user data associated with the user with additional users in the group of users and to provide intercommunication among each user in the group of users;
wherein at least part of the user data is selectable between being privately held and publicly shared;
wherein the user data that is publicly shared is comparable by each user with at least one other user in the group of users;
wherein the rules establish allowance criteria for at least one of a bet value, a bet type, a bet expiration, and scoring procedure;
wherein the bet value defines criteria for valuation of winning the simulation sports game;
wherein the bet type defines criteria for determining a winner of the simulation sports game;
wherein the bet expiration defines criteria for fixing an end date of the simulation sports game;
wherein the scoring procedure defines a measurement of the statistic relating to the sporting event using the criteria for determining the winner of the simulation sports game; and
wherein the steps of creating the bet, posting the created bet, creating the counteroffer and posting the created counteroffer are carried out using the computerized device.

13. A method according to claim 12 wherein a league is definable to include members selected from the group of users, and wherein the league is configurable to include membership restrictions relating to the user data of each user in the group of users.

14. A method according to claim 13 further comprising comparing the user data with the membership restrictions to determine eligibility of the user for admission into the league and wherein the alert is generated to indicate the eligibility.

15. A method according to claim 13 wherein the league includes a moderator to selectively analyze one of the created bet and the created counteroffer with the rules in the database for compliance with the rules to determine whether the simulation sports game is approvable, the moderator being associated with the league.

16. A method according to claim 12 wherein the user is included in a group of users, wherein a performance based ranking system is included to provide a ranking of each user against the group of users, wherein operation of the performance based ranking system comprises:
defining the rules to assign weighted points to the confirmed bet relating to the terms of the confirmed bet and an outcome of the confirmed bet;
wherein the ranking is defined by an accumulation of the weighted points, and wherein the ranking is associated with the user;
comparing the confirmed bet made by the user to the rules to determine a number of weighted points to be added to the accumulation of weighted points of the user;
comparing the accumulation of weighted points of the user to the accumulation of weighted points of additional users within the group of users to determine the ranking of the user among the users in the group.

17. A method according to claim 12 further comprising the creator selectively allowing the created bet to be split and the user selectively requesting the created bet to be split, wherein splitting the created bet is defined as allowing parts of the created bet to be independently confirmable.

18. A method according to claim 12 wherein the statistics relating to the sporting event are included on a network connected device to be accessed by the fantasy betting application.

19. A method according to claim 12 further comprising selectively defining at least one of an expiration of the created bet, a duration of the created bet, and odds relating to the created bet.

20. A method according to claim 12 further comprising acquiring approval for one of the created bet and the created counteroffer from a moderator prior to the simulated sports game being confirmable, wherein the moderator compares the one of the created bet and the created counteroffer with the rules for compliance to determine whether the simulated sports game is approvable, and wherein the alert is generated to indicate whether the simulated sports game is approvable.

21. A fantasy betting application comprising:
a database to include data, the database being stored in a computerized device including a processor and memory;
an interface to be manipulated by a creator or a user to manage a simulation sports game relating to statistics of a sporting event
a rules engine to manage rules relating to the simulation sports game, the rules being stored in the database and configured to define allowance criteria for a bet value, a bet type, and a scoring procedure, wherein the bet value defines criteria for valuation of winning the simulation sports game, the bet type defines criteria for determining a winner of the simulation sports game, and the scoring procedure defines a measurement of the statistic relating to the sporting event using the criteria for determining the winner of the simulation sports game;
wherein the database is accessible over a network;
wherein the processor is configured to execute instructions to manage the simulation sports game by
facilitating creation of a bet by the creator to define a created bet that comprises conditions of the bet including a bet duration and a negotiations setting terms of the bet including a bet amount and a bet subject comprising at least one of a team, a position, a play, and a player relating to the sporting event, and limitations of a counteroffer wherein the negotiation setting is configured to selectively control allowance of the counteroffer and wherein the limitations include a range of allowable values corresponding to the terms of the bet;
facilitating posting of the created bet to be receivable and viewable by a user using the interface;
facilitating creation of the counteroffer by the user to define a created counteroffer that comprises conditions of the counteroffer including a counteroffer duration, and selectively negotiated terms of the counteroffer received as at least one response from the creator to at least one question by the user and selected from the range of allowable values corresponding to the limitations of the counteroffer, wherein the terms of the counteroffer include a counteroffer amount and a counteroffer subject relating to the sporting event and comprising at least one of a team, a position, a play, and a player; and facilitating initiation of the simulation sports game to define a confirmed bet that comprises one of acceptance by the user of the posted bet and acceptance by the creator of the posted counteroffer, and an alert transmitted to the interface indicating receipt of the acceptance.

22. A system according to claim 21 wherein the user is associated with user data to identify information relating to the user, wherein a league is definable to include members selected from a group of users, and wherein the league is configurable to include membership restrictions relating to the user data of each user in the group of users.

23. A system according to claim 22 wherein the processor is configured to execute instructions to compare the user data with the membership restrictions to determine eligibility of the user for admission into the league and to generate the alert to indicate the eligibility.

24. A system according to claim 22 wherein the league includes a moderator configured to selectively analyze the created counteroffer with the rules in the database for compliance with the rules to determine whether the simulated sports game is approvable, the moderator being associated with the league.

25. A system according to claim 21 wherein the user is included in a group of users, wherein a community interface is included to selectively share user data associated with the user with additional users in the group of users and to provide the intercommunication among each user in the group of users, wherein at least part of the user data is selectable between being privately held and publicly shared, and wherein the user data that is publicly shared is comparable by each user with at least one other user in the group of users.

26. A system according to claim 21 wherein the user is included in a group of users, wherein a performance based ranking system is included to provide a ranking of each user against the group of users, wherein operation of the performance based ranking system comprises:

defining the rules to assign weighted points to the confirmed bet relating to the terms of the confirmed bet and an outcome of the confirmed bet;

wherein the ranking is defined by an accumulation of the weighted points, and wherein the ranking is associated with the user;

comparing the confirmed bet made by the user to the rules to determine a number of weighted points to be added to the accumulation of weighted points of the user;

comparing the accumulation of weighted points of the user to the accumulation of weighted points of additional users within the group of users to determine the ranking of the user among the users in the group.

27. A system according to claim 21 wherein the creator selectively allows the created bet to be split, wherein the user selectively requests the created bet to be split, and wherein splitting the created bet is defined as allowing parts of the created bet to be independently confirmable.

28. A system according to claim 21 wherein the statistics relating to the confirmed bet are included on a network connected device.

29. A system according to claim 21 wherein approval is selectively acquired for the created counteroffer from a moderator prior to the created counteroffer being confirmable, wherein the moderator compares the created counteroffer with the rules for compliance to determine whether the simulated sports game is approvable, and wherein the alert is generated to indicate whether the simulated sports game is approvable.

30. A system according to claim 21 funds are accepted for the confirmed bet, wherein the funds are held until the winner of the confirmed bet is determined, wherein at least part of the funds are dispersed to the winner of the confirmed bet after the winner is determined, wherein the funds to be collected are defined by the terms of the confirmed bet, wherein disbursement of the funds to the winner is defined by the conditions of the confirmed bet, and wherein a fee is collectible from the funds prior to dispersing remaining funds to the winner.

* * * * *